K. R. SINGER.
ELECTRIC METER.
APPLICATION FILED MAR. 24, 1915.
1,222,042.
Patented Apr. 10, 1917.
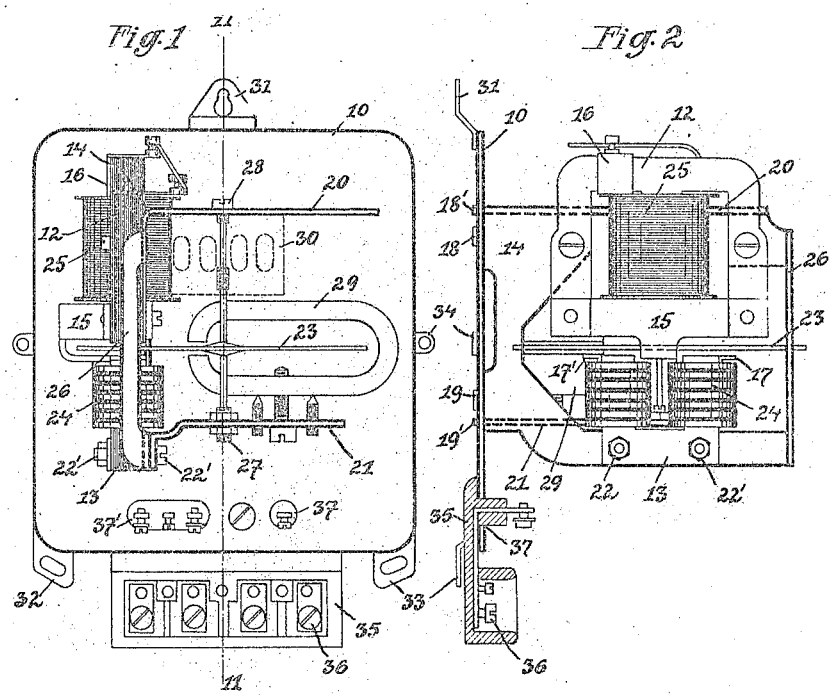
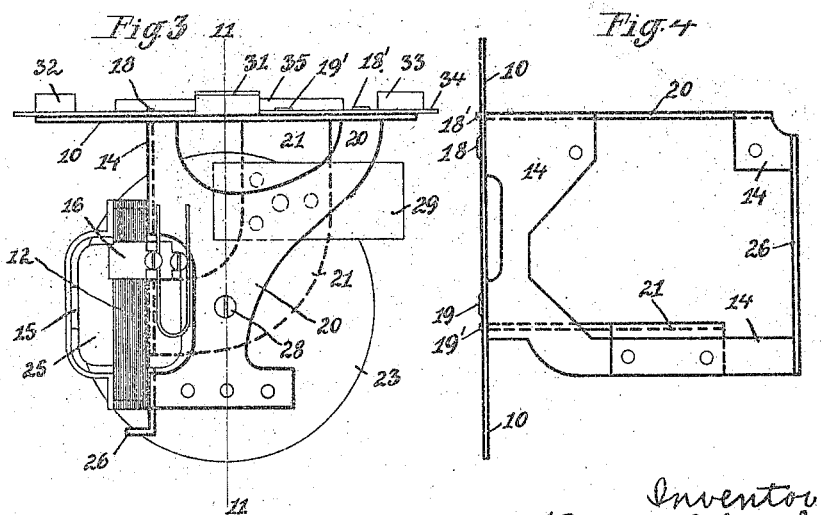
Inventor
Konrad Robert Singer
By Knight Bros
his Attorneys

UNITED STATES PATENT OFFICE.

KONRAD ROBERT SINGER, OF NUREMBERG, GERMANY, ASSIGNOR TO SIEMENS SCHUCKERT WERKE, GESELLSCHAFT MIT BESCHRANKTER HAFTUNG, A CORPORATION OF GERMANY.

ELECTRIC METER.

1,222,042.      Specification of Letters Patent.      Patented Apr. 10, 1917.

Application filed March 24, 1915. Serial No. 16,720.

*To all whom it may concern:*

Be it known that I, KONRAD ROBERT SINGER, a German subject, and resident of Nuremberg, Bavaria, Germany, have invented certain new and useful Improvements in Electric Meters, of which the following is a specification.

This invention relates to a metering apparatus for alternating current and is especially designed to meet the demand of electrical power stations regarding small, light, cheap and high-grade electricity meters, a feature much to be desired which as well known has so far presented considerable difficulties to the designer of such apparatus.

The meter according to my invention represents a number of novel features in the construction of the frame. One feature of my invention consists in using as support for the driving system, that is for the electromagnets, a member made by punching, and in fastening the same laterally of the central plane of the meter and essentially parallel thereto on the ground plate, and in joining the upper and lower ends of this punched member still farther with the ground plate by means of braces. By the term central plane of the meter that plane is understood which is perpendicular to the ground plate and which intersects the latter in its vertical center line.

By such a connection of the ground plate and the carrier of the driving system the effect is attained that these two constructive elements reinforce or stiffen each other and consequently form an extremely strong and rigid frame in spite of their relatively small dimensions and small weight. A further feature of this invention consists in the manner of mounting the remaining parts of the meter, that is to say the rotor, the brake magnets and the counting works on said braces by which the upper and lower ends of the carrier for the driving system are connected with the ground plate. This kind of supporting renders superfluous all especial carriers for the enumerated parts of the meter and simplifies the construction and furthermore leaves full liberty to the designer for arranging the several parts on the frame of the meter. By this the construction of the meter is easily accessible for inspection and of pleasing appearance throughout.

In the accompanying drawing a construction of the meter according to the present invention is described in which Figure 1 is a front view of the meter, Fig. 2 a side view to Fig. 1. Fig. 3 a top view and Fig. 4 a side view of the meter frame alone.

The frame of the meter is formed by a ground plate 10 which is punched from sheet metal and the carrier 14 for the driving system with the braces 20 and 21. This carrier 14 and the brace 20 are punched together from sheet iron and are riveted at 18, 18' and 19 to the ground plate 10. The brace 21 is an independent piece made by punching and is also riveted at 19' to the ground plate. The connection between ground plate and the carrier 14 for the driving system is accomplished by the bolts and screws 22, 22' by means of which also the series field magnet 13 which is inserted in the main circuit of the driving system is connected to the carrier 14.

The carrier 14 possesses an opening as shown in Fig. 4 by which the necessary clearance is obtained for mounting the rotor disk 23, the winding 24 of the series field magnet and the winding 25 of the shunt field magnet. The part 26 of the carrier 14 which closes this opening at the front is rectangularly bent out of the plane of the carrier by which the height of the carrier is reduced and a further reinforcement of the frame obtained. The opening in the carrier 14 also extends into the upper brace 20 and forms here the recess through which the part of the winding 25 is visible which faces the axis of the rotor, as shown in Fig. 3. A further recess is provided near the ground plate at the brace 20 for reducing the weight of the same. The front end which points away from the ground plate and is shaped like a hammer (Fig. 3) serves as carrier for the counting mechanism which is indicated at 30 in Fig. 1. The brace 20 also carries the upper bearing 28 for the rotor 23 and the lower brace 21 carries the lower bearing 27 of the rotor and besides also the brake magnet 29 which is fixed in the known manner upon three threaded pins with a set screw, as clearly shown in Fig. 1 of the drawing.

The driving mechanism of the meter is of the well known kind. The triple-core shunt field magnet is positioned at the one side of the rotor disk 23 and provided with a magnetic back connection 15 which conveys the lines of force coming out of the middle core through the disk of the shunt field for the driving mechanism back to the lower ends of the exterior magnet cores. The magnet 12 furthermore contains magnetic shunts to the said magnetic back connection 15 between the middle and the exterior cores which shunts close the path of the voltage choke field. In the drawing these shunts are not visible, being covered by other parts. The series field magnet 13 is of the usual U-shaped form and its pole surfaces are enlarged in lateral direction by especially formed pieces or shoes of iron 17 and 17'. It is mounted upon the carrier 14 by means of the screws 22, 22' by which as above mentioned simultaneously the connection between the carrier 14 and the lower brace 21 is accomplished. The shunt field magnet 12 at its outer cores is fixed upon the carrier 14 by means of two screws, so that its yoke will project above the brace 20. By this it is made possible to place short-circuit windings with regulable resistance around one or both halves of the yoke. In the drawing for instance said short-circuit winding 16 is shown as being arranged upon the rear half of the yoke, the resistance of said winding being regulated in the well known manner by the motion of the wire clip.

For the sake of completeness there are further shown in the drawing the fastening eyelets 31, 32 and 33 at the ground plate, furthermore a strip of sheet metal 34 whose ends project laterally beyond the ground plate serving for the fastening of the cap of the casing, and finally the terminal board 35. This terminal board which is made from insulating material is constructed in the known manner, so that the smooth edge of the ground plate 10 does not need to be interrupted for the fastening thereof. The terminal board is fixed on the back of the ground plate 10 by one or more screws which are only accessible from the front of the ground plate. For introducing the terminals into the interior of the meter holes 37 and 37' are provided in the ground plate and the ends of the terminals projecting through these holes into the interior of the casing are insulated by extensions on the terminal board which fit into the holes 37 and 37'.

In the example as shown the carrier 14 for the driving system and the braces 20 and 21 are given particular shapes for the reason that in order to properly show this construction in the drawing a particular driving system and a particular arrangement of the brake magnet and the counting works had to be assumed. It must be understood, however, that these specific forms of the carrier for the driving system and of the braces are in no way essential for the present invention. These forms may be changed if according to this invention a carrier shall be constructed for another driving system or if the brake magnet and the counting works shall be otherwise arranged. Also the rivets between the frame parts 14, 20, 21 and the ground plate 10 do not represent the only possible kind of connection, as instead thereof also a connection by screws or by welding may be employed.

Also the way of making the carrier for the driving works having an upper brace with the other piece integral therewith and the specific construction of the lower brace is only one of the several possible constructions according to this invention. Thus for instance both braces may be made integral with the carrier for the driving works or both braces may be made separate from this carrier.

Having thus described my invention I claim as new and desire to secure by Letters Patent of the United States:—

In an electric meter of the Ferraris type a supporting means for the meter mechanism consisting of a base plate, an angularly shaped and braced sheet metal member having the like sides of its two legs fastened substantially at right angles to said plate and adapted to carry on one of its legs the fixed magnets of the meter mechanism, and a second sheet metal member, connecting the free end of said carrying leg with said plate and supporting conjointly with the other leg the rotatable member of the meter.

In testimony whereof I have hereunto set my signature in the presence of two subscribing witnesses.

KONRAD ROBERT SINGER.

Witnesses:
    OSCAR BOCK,
    LLEWELLYN K. WINANS.